J. S. FIELD.
SHEET-METAL CAN.
No. 186,084. Patented Jan. 9, 1877.
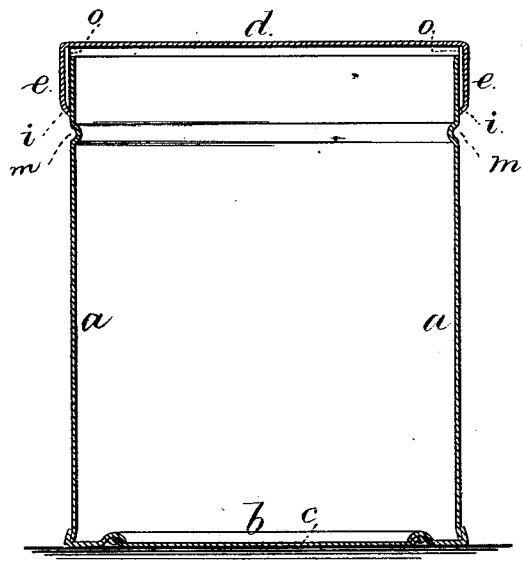
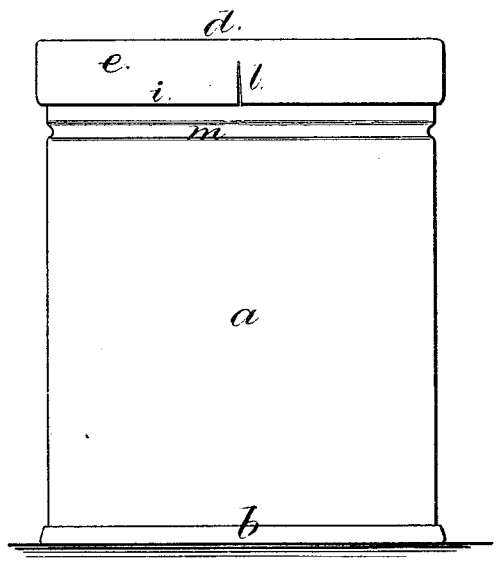
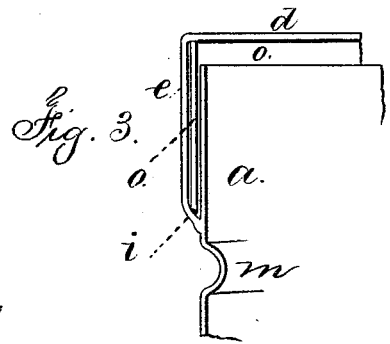
Witnesses
Chas H Smith
Geo. D. Pinckney
Inventor
Joseph S. Field.
per Lemuel W. Serrell
att,

UNITED STATES PATENT OFFICE.

JOSEPH S. FIELD, OF BROOKLYN, NEW YORK.

IMPROVEMENT IN SHEET-METAL CANS.

Specification forming part of Letters Patent No. 186,084, dated January 9, 1877; application filed December 11, 1876.

*To all whom it may concern:*

Be it known that I, JOSEPH S. FIELD, of Brooklyn, in the county of Kings and State of New York, have invented an Improvement in Sheet-Metal Cans, of which the following is a specification:

This invention is available in cans for holding paints, preserves, solids or liquids, from which the atmosphere is to be excluded. I make use of a soldered joint that is easily broken by pressure upon the end of the can.

In the drawing, Figure 1 is a section of the can complete. Fig. 2 is an elevation of the same, showing the incision in the rim of the cover, and Fig. 3 is a section of a portion of the can and cover in enlarged size.

The body of the can is of any desired size or shape. The sides $a$ and bottom $b$ are united firmly together. If the can is used for holding liquid or semi-liquid materials it is preferable to solder on the cover, as hereafter described, and to fill the can while in an inverted position through the perforated bottom, and then solder on the disks $c$, as has heretofore been done. The opening might be in the cover instead of the bottom.

The cover $d$ is made with a rim, $e$, either out of one piece of sheet metal, or out of two, as heretofore usual. The first peculiarity of my cover is the inwardly-bent edge $i$ of the rim. The object of this is to lessen the extent of surface soldered together, for where the rim of the cover is cylindrical the solder runs in between the surfaces and holds them so firmly that they cannot be easily separated.

By my inwardly-bent rim the amount of solder is lessened, the edge of the rim made elastic to a sufficient extent to cause it to pass over the can more easily than a tight-fitting rim, and at the same time the edge of the rim will set sufficiently close to the side of the can to retain the solder that unites the two, principally on the outside.

The edge of the rim can be spread by blows upon the outside, so as to loosen the cover, if required, after the solder has been broken, as hereafter described.

The next peculiarity of the rim is one or more incisions or cuts, $l$, that separate the metal at the edge and some little distance up the sides of the rim. The object of the incision or incisions is to allow the rim to spread, if necessary, and cause the same to pass over the can easily, and to make the can tight this incision is closed by solder; but it breaks open by a comparatively slight force.

It is now to be understood that the lid is not placed with the inner surface against the end of the can, but a space of an eighth of an inch, more or less, is left at this place, as shown; hence, if the cover is driven down upon the can by a hammer or pressure the edge of the sheet-metal rim breaks away from the body, the solder being cut or broken, and thereby the cover is liberated, and the cover will spread by the metal separating at the incisions, so that the cover can be put on and taken off easily.

A groove, at $m$, may be used to indicate the position of the edge of the cover.

If the sheet metal is sufficiently stiff the foregoing is all that will be necessary; but to aid in supporting the edge and insuring a separation of the solder, especially with thin metal, I make use of a ring or band, $o$, that is preferably of sheet-iron, so that the solder will not adhere to the same. This band sustains the pressure upon the cover, and causes the separation at the edge of the rim.

I am not the original and first inventor or discoverer of a sheet-metal can, provided with an interspace between the cover and body of the can, the two being united by a frangible joint for the purpose of opening the can by directly applied vertical force; nor of such a construction when the rim of the can turns against the body, and is soldered thereto only at or near its turned edge.

I claim as my invention—

1. The sheet-metal cover for a can, made with a rim that is parallel, or nearly so, with the body of the can, with the edge of the rim turned inwardly, and with one or more incisions in the rim, the incisions being closed and the rim soldered to the can, as set forth.

2. The separate band $o$, introduced between the soldered rim $e$ of the can cover and the body of the can, and extending from the soldered joint to cover $d$, or nearly so, for the purposes and substantially as set forth.

Signed by me this 8th day of December, A. D. 1876.

JOSEPH S. FIELD.

Witnesses:
GEO. T. PINCKNEY,
CHAS. H. SMITH.